Feb. 6, 1923.
F. IKOMA.
FLOWERPOT CLEANING MACHINE.
FILED MAR. 5, 1919.
1,444,420.
3 SHEETS—SHEET 1.
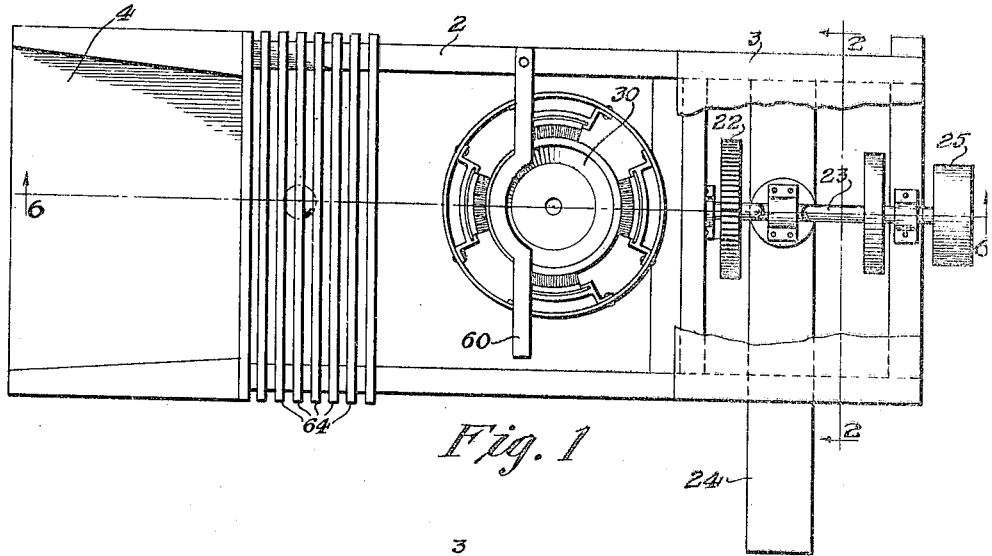
Fig. 1
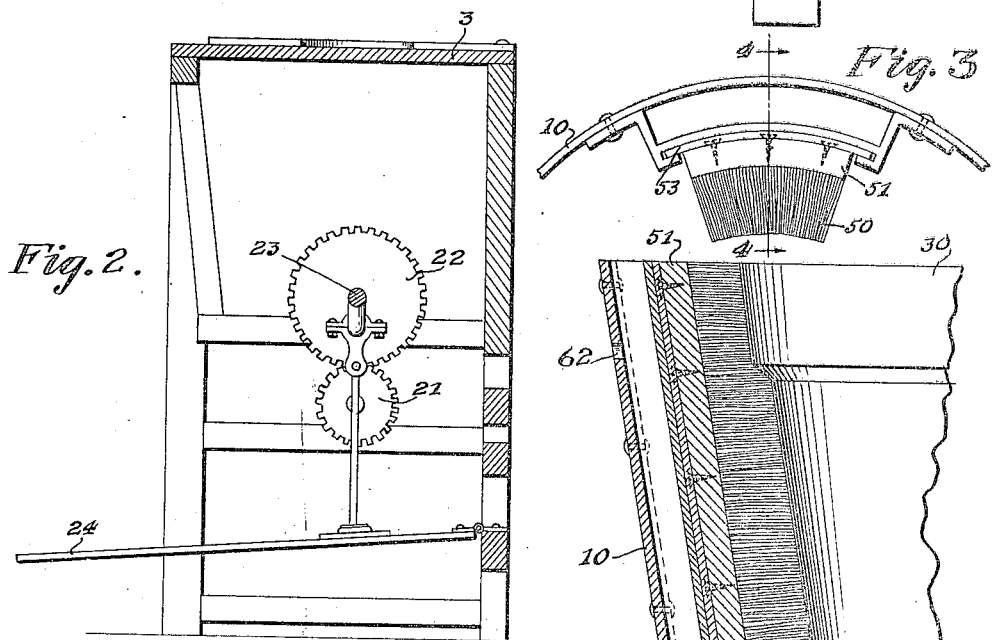
Fig. 2.
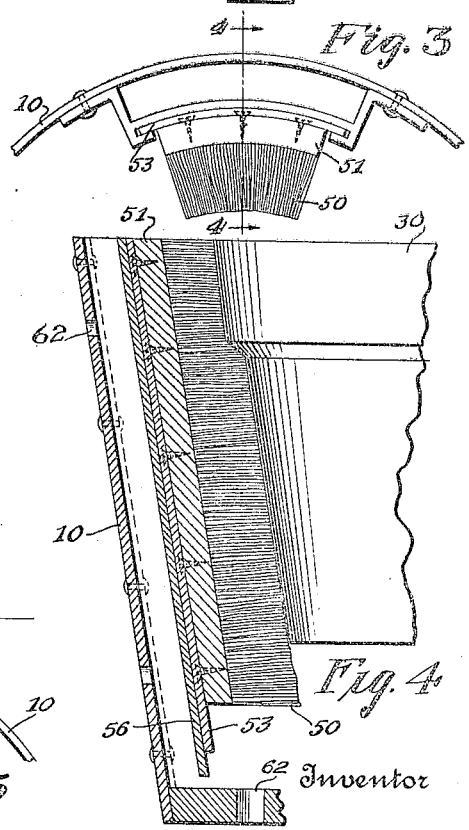
Fig. 3
Fig. 4
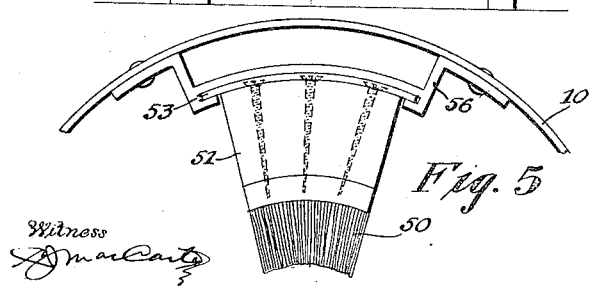
Fig. 5
Witness
D. MacCarty
Inventor
Frank Ikoma
by Eugene E. Brown
Attorney

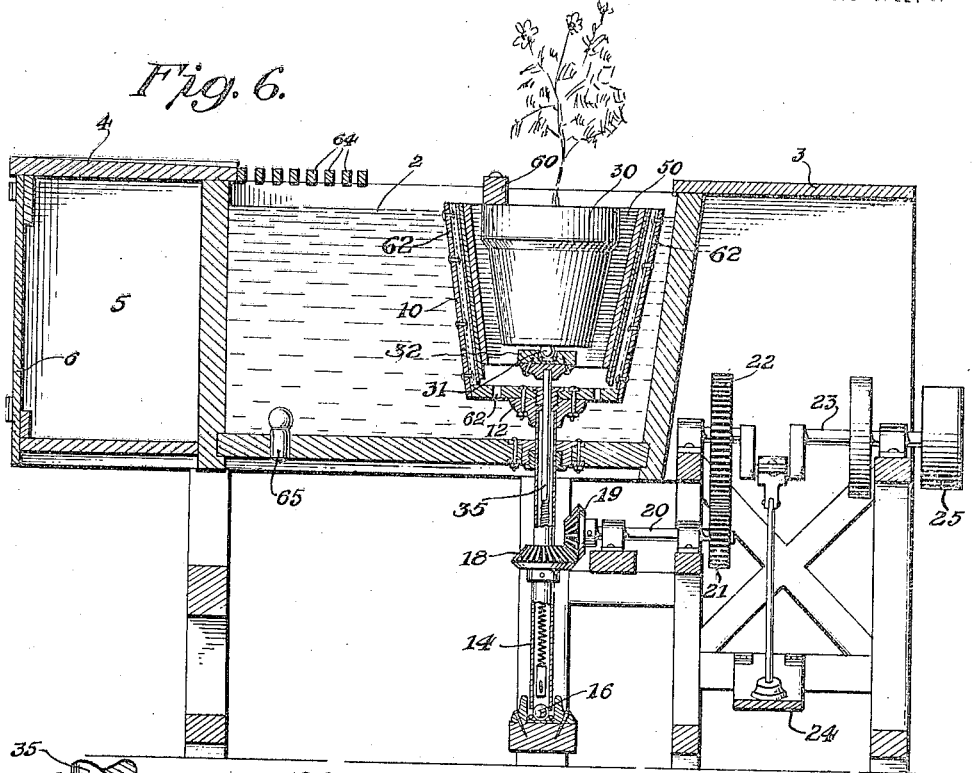
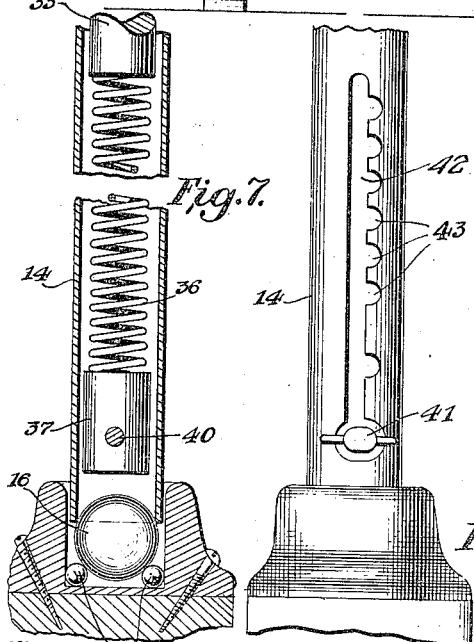
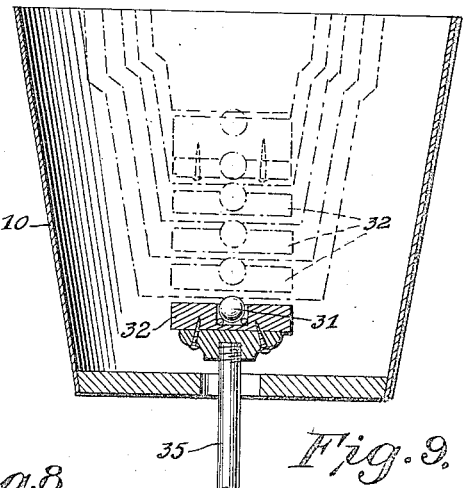

Feb. 6, 1923.

F. IKOMA.
FLOWERPOT CLEANING MACHINE.
FILED MAR. 5, 1919.

1,444,420.

Inventor
Frank Ikoma
By Eugene C. Brown
Attorney

Patented Feb. 6, 1923.

1,444,420

UNITED STATES PATENT OFFICE.

FRANK IKOMA, OF SAN MATEO, CALIFORNIA, ASSIGNOR OF ONE-TENTH TO EDWARD C. BEALS, OF SAN MATEO, CALIFORNIA.

FLOWERPOT-CLEANING MACHINE.

Application filed March 5, 1919. Serial No. 280,735.

*To all whom it may concern:*

Be it known that I, FRANK IKOMA, a subject of the Emperor of Japan, residing at San Mateo, in the county of San Mateo and State of California, have invented certain new and useful Improvements in Flowerpot-Cleaning Machines, of which the following is a specification.

This invention relates to apparatus for cleaning and scouring the fungus, mold and dirt from flower pots which has accumulated in the hot house and preparatory to delivering them to customers.

The main purpose of my invention is to provide an apparatus which will quickly and thoroughly clean flower pots without removing the earth plants and which may be readily adjusted to accommodate pots of different sizes.

Figure 10:
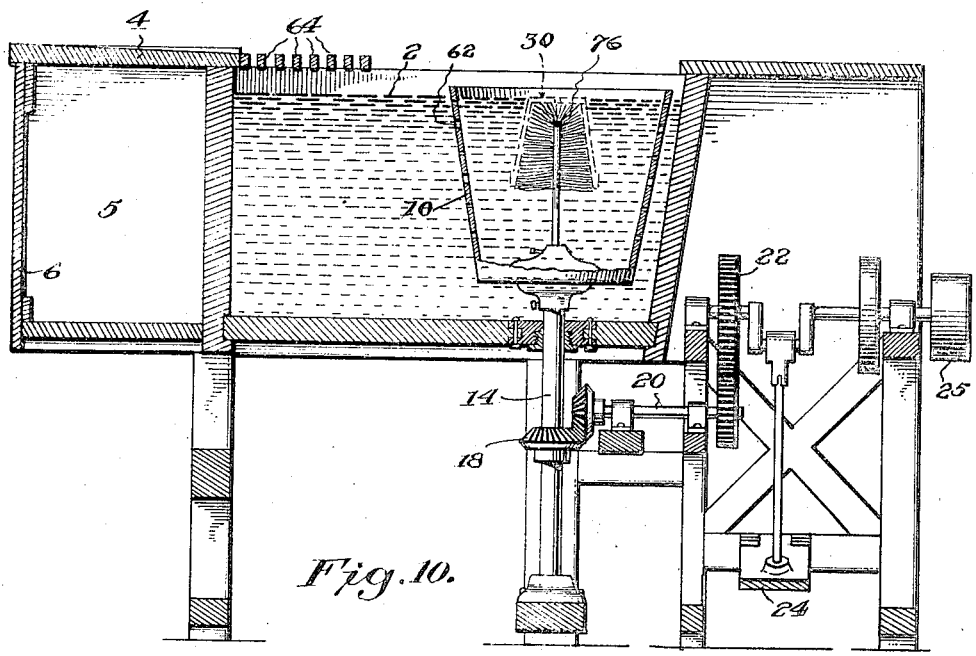
Figure 12:
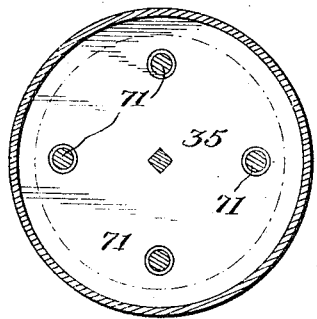
Figure 11:
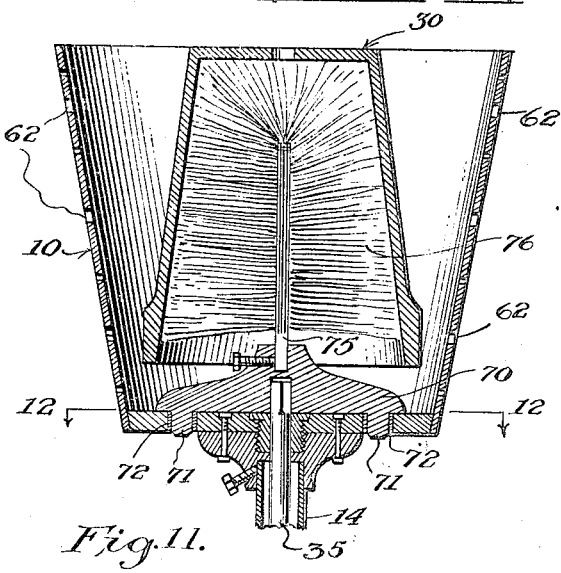

For the purpose of clearly disclosing the invention I shall refer in the following description to the accompanying drawings, in which Figure 1 is a top plan view of an apparatus embodying my invention; Fig. 2 is a vertical sectional view on the line 2—2 of Fig. 1; Figs. 3 and 5 are end views of the scouring brushes and the means for adjustably securing them in the rotary housing; Fig. 4 is an enlarged fragmentary vertical sectional view of the brush holder and one of the brushes; Fig. 6 is a longitudinal vertical sectional view on the line 6—6 of Fig. 1; Figs. 7 and 8 are enlarged fragmentary detail views in section and side elevation respectively, of the rotary support or standard, and step bearing for the brush holder; and Fig. 9 is a sectional diagrammatic view showing the manner of adjusting the support or standard to accommodate pots of different sizes; Fig. 10 is a longitudinal sectional view of the apparatus shown in Figs. 1 and 6 but provided with brushing mechanism for cleaning the interior of the pots; Fig. 11 is an enlarged vertical sectional view of interior cleaning device shown in Fig. 10; and Fig. 12 is a horizontal sectional view on the line 12—12 of Fig. 11.

The frame of the machine is provided with a central tank portion 2, a platform or table 3 at one end upon which the pots may be placed, and a draining board or platform 4 at the opposite end which slopes toward the tank. A closet 5 for tools, etc., may be constructed under the draining board and provided with a door 6 if desired.

The brushes for scouring and cleaning the pots are secured in a bucket-like carrier or support 10, which is fastened in any suitable manner to a head or spider 12 on the upper end of a tubular shaft 14, which is revoluble on a step bearing comprising a large ball 16, mounted upon an annular series of smaller balls 17. The shaft carries a gear 18 meshing with a gear 19 on the shaft 20, which is driven through gears 21, 22 from the crank shaft 23, actuated either by a foot treadle 24 or by means of a belt pulley 25 connected to a source of power.

The flower pots 30, when placed in the cleaning apparatus, are centrally supported on a ball bearing 31, carried in a recess in a plate 32 secured to the upper end of a rod or spindle 35 which is yieldingly supported on a helical spring 36, the lower end of the spring resting upon a block 37. The spindle 35 may be raised to lift the bearing seat 32 to suit the height of different pots by means of the thumb-bolt 40 having an oval or cam-shaped head 41, which may be turned with its longer axis vertical so that it can be moved along the slot 42 in the tubular shaft 14, and then turned horizontally into one of the notches 43 to secure it in the adjusted position. The block 37, spring 36 and spindle 35 may rotate with the tubular shaft 14, while the flower pot is held stationary, friction between the plate 32 and the pot being practically eliminated by the interposed ball bearing 31.

The scouring brushes preferably have their bristles 50 shaped to conform to the configuration of the pot. The block 51 which carries the bristles is secured to a plate 53 which projects at either side to form flanges which slide into grooves or channels formed in the brush holders 56 riveted or otherwise secured to the inner wall of the carrier 10. One set of brushes can be readily substituted for another set for the purpose of accommodating pots of different sizes. The brushes can be made of different thicknesses by varying the size of the backing blocks 51 as indicated in Figs. 3 and 5.

The operation of the apparatus will be understood from the foregoing detailed description of the structural parts. When a pot containing a plant is brought from the hot house to be cleaned and scoured it may be placed on the table or shelf 3, while the proper set of brushes are inserted in the holders 56 within the brush carrier 10, and the height of the supporting spindle is adjusted. The pivoted arm 60 is then swung back and the pot is placed within the carrier with the hole in the bottom of the pot fitting over the ball bearing 31. The arm 60 is then swung back over one side of the pot as indicated in Fig. 1, the other side of the pot being held by the hand of the operator.

The tank having been filled with water so that it passes up through the holes 62 in the bottom of the carrier, power is applied to the shaft 23, either by means of the foot treadle 24 or through the pulley 25, thereby rotating the brush carrier while the pot is held stationary. The abrasive action of the brushes in conjunction with the water in the carrier which is constantly agitated, very quickly removes the fungus mold and dirt from the surface of the pot and thoroughly scrubs and cleanses it. When the pot is removed from the scouring apparatus it is first placed on the drain bars or grating 64 and afterward transferred to the drain board 4 until sufficiently dry.

The water and sediment may be drained from the tank by removing the plug 65.

The advantages which are afforded by my pot cleansing apparatus will be appreciated, especially by florists. The pots may be quickly and effectively cleaned without removing the plants and without endangering even the most delicate ones. The yielding support prevents any jars or shocks from being transmitted to the pot. The means for quickly adjusting the height of the support and for readily inserting a proper set of brushes adapts the machine to flower pots of all sizes, and yet there are no complicated parts. The brushes may be placed in frames and be taken out as a whole when changing for the purpose of accommodating a different size pot. It is obvious also that the brushes may be secured directly to the inner side of the bucket and that different buckets may be employed and the buckets may be disconnected from the rotary shaft so that one may be substituted for another.

For the purpose of cleaning the inside of the pots I provide the apparatus shown in Figs. 10, 11 and 12. When it is desired to arrange the apparatus for inside cleaning, the head or disk 32 is disconnected from the upper end of the shaft 35, and a disk or base member 70 is substituted. The disk 70 is provided with a socket to receive the end of the shaft 35 and with a plurality of lugs 71 which fit into bushings 72 within holes in the bottom of the bucket.

The stem 75 of the brush 76 fits into a socket in the upper side of the disk 70 and is held in place by a set screw. When changing the brushes to operate upon pots of varying sizes, the base 70 may be lifted out of the bucket. It is to be understood that the bucket is provided with brush holders and brushes for cleaning the outside of the pots as shown in Figs. 1, 3, 4 and 5. The brushes may be provided with bristles of hair or steel or other suitable material.

While I have particularly described the construction illustrated in the accompanying drawings, for the purpose of disclosing my invention it is to be understood that various changes and modifications may be made without departing from the spirit of my invention.

I claim:—

1. A flower pot cleaning apparatus, comprising a vertically disposed rotary cylindrical carrier, a brush holder secured to the interior of said carrier, a brush provided with means to removably engage said holder, a yielding support for the flower pot extending within the carrier, means for adjusting the height of said yielding support with respect to said carrier, and means for rotating said carrier.

2. A flower pot cleaning apparatus, comprising a tank adapted to hold a supply of water, a vertically disposed cylindrical carrier rotatably mounted within said tank and provided with apertures to permit the passage of water from the tank, a plurality of brush holders secured to the interior of said carrier and provided with lateral guides, brushes having means to engage said guides, a tubular shaft secured to carrier, means for rotating said shaft, a spindle slidable within said shaft and having a bearing on its upper end to receive a pot and a spring support for the lower end of said spindle adjustably secured within said shaft.

In testimony whereof I affix my signature.

FRANK IKOMA.